INVENTOR.
STEPHEN V. CHELMINSKI

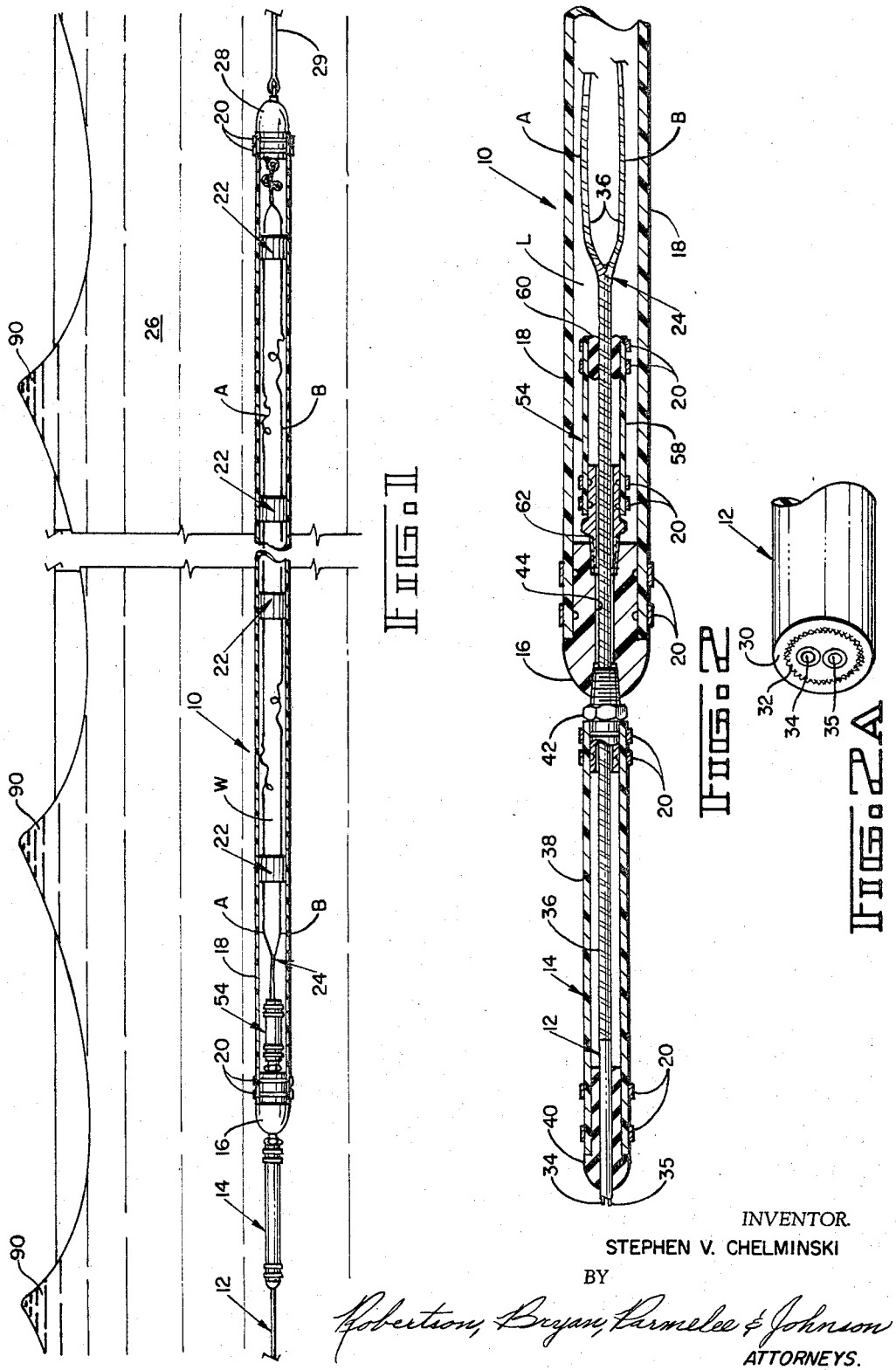

United States Patent Office 3,378,815
Patented Apr. 16, 1968

3,378,815
HYDROPHONE EEL STRUCTURE FOR UNDERWATER SEISMIC EXPLORATION
Stephen V. Chelminski, Wilton, Conn., assignor to Bolt Associates, Inc., East Norwalk, Conn., a corporation of Connecticut
Filed Sept. 16, 1966, Ser. No. 580,092
16 Claims. (Cl. 340—7)

ABSTRACT OF THE DISCLOSURE

A hydrophone eel structure for underwater seismic exploration is provided which is sensitive and accurate in response, is easily towed and is readily coiled for storage, wherein both ends of each hydrophone unit are responsive to the acoustical impulses, being non-responsive to axial acceleration, and the length of the tubular casing from end to end can be filled with liquid or emptied by removing the tail plug. The pressure of the liquid throughout the length of the casing is equalized by providing for passage of the liquid throughout the length of the casing, and because of the sealed arrangement of each hydrophone unit and the associated connection wires, it is possible to use fresh or salt water as the interior liquid. At the nose of the eel structure a towing assembly provides a flexural transition between the cable and the eel for preventing flexing stress concentration and for isolating the wire connections from towing stress, while the cable covering has braided filaments embedded therein surrounding its electrical wires for carrying the towing stress.

*Description*

This invention relates to hydrophone eel structures adapted to be towed from a craft for use in carrying out underwater seismic exploration of geologic formations and strata beneath the body of water. More particularly, the invention relates to hydrophone eel structures for receiving acoustical signals in a body of water during the making of a seismic survey and for converting these acoustical signals into corresponding electrical signals without distortion so that the electrical signals can be recorded and accurately analyzed to reveal information about the sub-bottom formations and strata.

Generally, when carrying out a seismic exploration, a survey craft proceeds along a known course with respect to a body of water, such as an ocean, sea, lake, river or sound, towing the hydrophone apparatus beneatth the surface of the water as seen in FIGURE 1 and means are used to generate powerful sound impulses of desired characteristics in the water. The hydrophone equipment is responsive to the acoustical signals in the water which have been reflected or refracted from the geologic formations and strata beneatth the body of water. The means for generating the sound impulses in the water may be associated with the survey craft or may be associated with a companion craft, depending upon the type of survey procedure being used.

Since water is such a good sound conductor, it is unnecessary to generate the impulses right on or in the ocean floor; they can be produced in the water near the surface. The acoustical impulses travel down through the water to the ocean floor and some of the energy is reflected. These acoustical impulses also penetrate into the ocean floor and are reflected or refracted from the substrata and various formations so that acoustical signals travel up through the water to the hydrophone apparatus.

In order to provide a survey which yields valuable information not only about the strata near the ocean floor but also about formations which are buried many thousands of feet beneath the ocean floor, it is important that the hydrophone equipment be extremely sensitive and accurate so as to be able to respond to the faint sound signals coming up through the water toward the surface and that the equipment cancel out spurious signals such as wave noises. Also, the hydrophone equipment itself should be capable of moving through the water without generating undue amounts of noise caused by swirling and burbling of the water about the hydrophone equipment. The hydrophone equipment is connected through an electric cable extending to the survey craft which has on board an amplifier and recording apparatus which may include a chart recorder, magnetic tape recorder, electronic analytical equipment, and so forth.

In accordance with the present invention a hydrophone eel structure is provided which is adapted to be towed from a craft to receive acoustical signals in a body of water for making a seismic survey of geologic formations and strata beneath the body of water, the hydrophone eel structure comprising a flexible tubular casing, towing means connected to the tubular casing for towing it through the water, a plurality of hydrophone transducer units secured within the casing at points spaced along its length, each of the transducer units being oriented in the casing with the axis of the units extending longitudinally of the casing, the units being responsive to acoustic signals impinging on their ends, the casing being adapted to have liquid therein between the transducer units, and having electrical connection means interconnecting the units.

Heretofore, the hydrophone equipment which has been used in seismic exploration systems has been large and cumbersome and was not easily towed or carried on board because of the weight and thick protective shoes surrounding each hydrophone unit. The hydrophone equipment, in spite of its thick protective shoes has been delicate, and any unusual bending movement or contact of the equipment would often result in faulty operation and lack of accuracy. When storing the hydrophone equipment, extreme caution would have to be exercised to make certain that it was not jarred or moved to result in effecting the reliable performance of the equipment in subsequent use. The bulky protective shoes surrounding the individual hydrophone units interfered with the ability to receive signals, and in many cases the axis of the hydrophone itself extended transversely of the casing, which tended to cause a directional or non-uniform response with respect to the relative position assumed by the equipment in the water. The bulkiness caused disturbances, eddies and swirling which produced spurious sounds in the water in the vicinity of the equipment thus tending to mask the desired signals to be received.

The hydrophone eel structure of the present invention overcomes these and other disadvantages of the prior art equipment in that it is a rugged, light, flexible structure enclosed within a small diameter casing that tows easily with minimal water disturbance and that can be readily coiled for storage. The present hydrophone structure is highly reliable and sensitive to receive acoustic sounds in the water under the wide range of conditions typically encountered at sea during seismic exploration. Another advantageous feature of the hydrophone structure of this invention is that it may be towed from various craft, such as a helicopter or airship, as well as from a boat or ship for use in underwater seismic exploration. Moreover, by virtue of the fact that the casing itself is full of water, the acoustical signals are accurately propagated with minimal loss or distortion from the ocean water through the wall of the casing into its interior, and the ends of the individual units are responsive to the signals within the interior liquid. In addition this structure provides a uniform response from any direction around the axis of the casing.

Additionally, the invention provides a reliable towing cable and electrical connection structure which isolates the interior electrical connections from stresses and including a nose member closing the front of the tubular casing to which it is attached, with electrical conductor means connected to each of the transducer units in the casing and extending within the casing to a region near the nose member. The towing cable contains an electric wire and has a flexible tension sleeve concentric about itself which is secured to the cable and to the nose member for towing the hydrophone eel structure with mechanical connection means for transferring any towing stresses from the cable to the nose member, to isolate the interior electrical connections from the towing force exerted on the cable.

In some cases the survey craft may be stationary during all or a portion of the survey operation or the survey may occasionally be made from the shore or from a tower and therefore the phrase "towed from a survey craft" or similar phrase is intended to include such situations.

In this specification and in the accompanying drawing are described and shown a hydrophone eel structure embodying the invention, but it is to be understood that this illustrative example of a presently preferred embodiment is not intended to be exhaustive nor limiting of the present invention, but on the contrary is given for purposes of illustration in order that others skilled in the art may fully understand the invention and the manner of applying the invention in practical use, so that they may modify and adapt it in various forms, each as may be best suited to the conditions of a particular survey.

The various features, aspects, and advantages of the hydrophone eel structure of the present invention will be more fully understood from a consideration of the following description of the best mode now contemplated by the inventor for carrying out the invention when considered in conjunction with the accompanying drawings in which:

FIGURE 1 is a side view shown partially in section of an embodiment of the hydrophone eel structure according to this invention;

FIGURE 2 is an enlarged sectional view of the apparatus for interconnecting the towing cable with the flexible tubular casing of the hydrophone eel structure;

FIGURE 2A is a view of a portion of the towing cable on enlarged scale;

Figure 3:
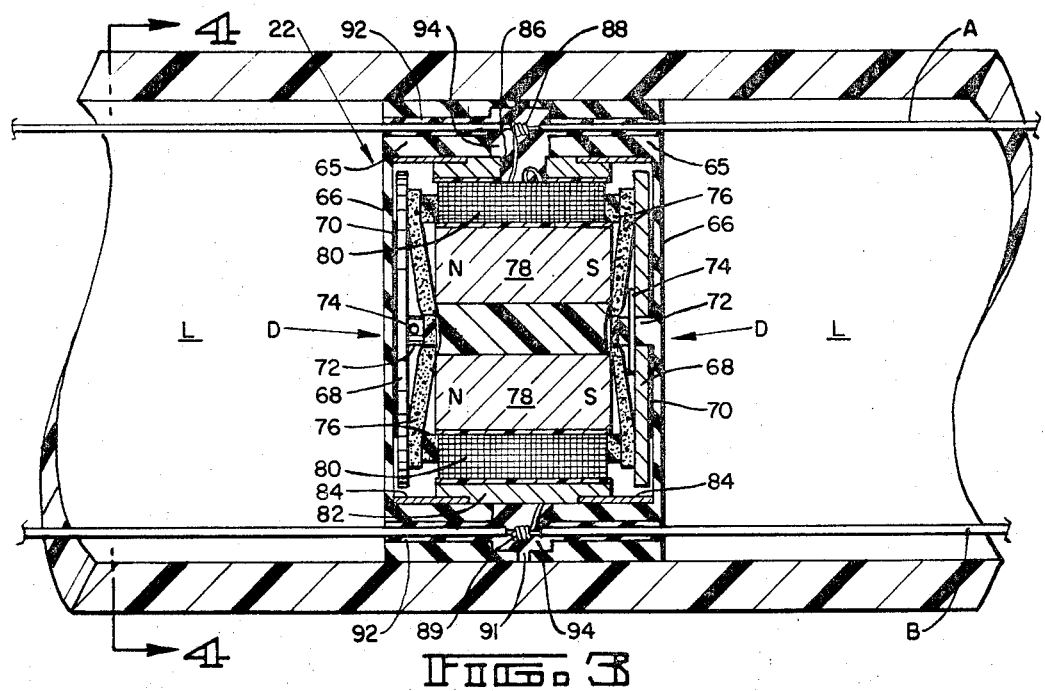
Figure 4:
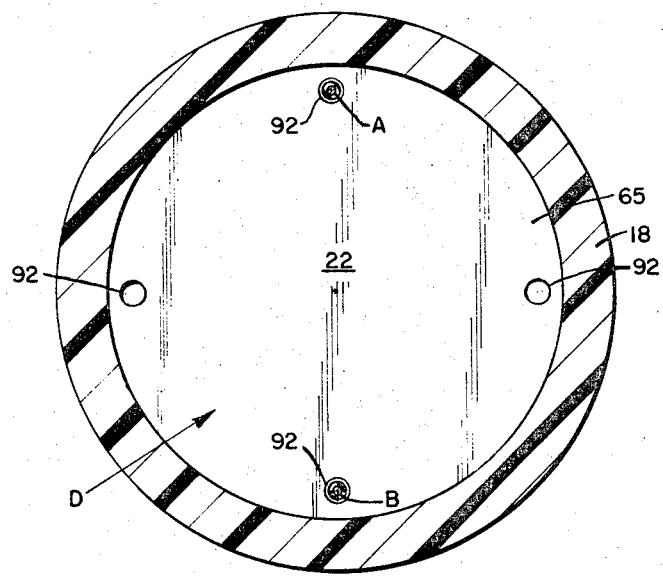

FIGURE 3 is an enlarged view of the internal structure of an individual transducer unit secured within the flexible tubular casing of the hydrophone eel structure; and FIGURE 4 is a cross-sectional view of the hydrophone eel structure taken along the line 4—4 in FIGURE 3 and showing the openings for water passage and electrical connections of the hydrophone eel structure according to this invention.

As shown in FIGURE 1, the hydrophone eel structure 10 is adapted to be towed from a survey craft of the types indicated above by means of a towing cable 12 extended from a towing assembly 14 connected to a nose member 16 of the eel structure 10. The eel structure has a flexible tubular casing 18 of a durable plastic material having a density generally approaching that of water, for example such as polyvinyl chloride highly plasticized, and which is closed on the front by the nose member 16 to which it is secured by clamp straps 20. Mounted within the casing 18 are a series of hydrophone transducer units 22 at points spaced along the length of the casing 18. For example, the eel structure 10 typically contains ten of the individual units 22, but in some cases it is constructed longer to contain more units and it can also be constructed shorter to contain four or six units.

In some cases the units 22 may be closely spaced and in other cases they may be more widely spaced. Generally, a longer structure 10 containing more units 22, which are relatively widely spaced, is used for making sub-bottom surveys in deeper water such as out in the ocean, and a shorter eel structure in which the units 22 are more closely spaced is used for making shallow-water surveys such as in harbors or bays. It will be understood that these relationships of length and unit spacing are generally the rule, but there are many different conditions which can be encountered in various geographic locations which call for exceptions to this general rule in making surveys. It is an advantage of this invention that it provides an eel structure which is convenient to make in different lengths as may be desired and in which the longitudinal spacing of the hydrophone units 22 can be predetermined as desired when the eel structure is assembled. Thereafter, the units 22 remain fixed in position.

The individual transducer units 22 are interconnected by wires A and B extending through the eel structure on opposite sides thereof to provide symmetry for uniform response and flexure in all directions. Wires A and B are mechanically bound together as shown at 24 in FIGURE 2 and are electrically connected through the towing assembly 14 to electric conductors within the towing cable 12 which is connected to the boat and its recording apparatus to provide a direct connection from transducer units 22 to the equipment on board the craft. It is noted that the wires A and B are slack between the units 22 so as to asssure that the towing stress is borne only by the casing 18 and not by these wires.

In between the transducer units 22 there is provision for liquid L to be present and arrangement for equalizing the interior pressure throughout the tubular casing 18. Importantly, the sound transmission characteristics of the interior liquid provides good coupling between the hydrophone units and the surrounding body of water 26. In most cases this interior liquid L is water, either fresh or salt, but it is also possible to use other liquid of lower specific gravity, such as a light silicone oil, depending upon the desired buoyancy of the overall structure 10. One of the advantages of this eel structure is that it enables the interior liquid L to be changed if desired.

When the survey conditions require that the eel structure 10 remain close to the surface of the body of water 26, then the liquid which is used is such as to provide an overall neutral or slightly positive buoyancy for the structure 10 as a whole. When the survey conditions require that the structure 10 be towed at a greater depth, then a liquid is used such as to provide an overall slightly negative buoyancy. Insome cases fresh water L is used when the structure 10 is to be immersed in salt water to take advantage of the slightly lower specific gravity of the fresh water.

The back of the flexible tubular casing 18 is closed by a removable tail plug 28, and a rearwardly extending length of rope 29 may be attached to the tail plug 28 analogus to the tail of a kite providing frictional damping to achieve greater control in towing the hydrophone eel through the water 26.

The towing cable 12 includes a strong, tough insulating waterproof covering 30 of rubber or plastic which may advantageously contain braided non-corrosive wire filaments 32 embedded therein as shown in FIGURE 2A, of bronze, stainless steel, monel, or similar material. These braided wire filaments serve to carry the towing stress and serve as armor to protect a pair of electric wires 34 and 35 which are suitably connected to the respective conductors A and B as by soldering thereto in the region 24 (FIGURE 2), with the connection and adjacent wires being wrapped by electrical waterproof tape 36, such as vinyl tape, extending within the casing 18 and out into the towing assembly 14 where the tape 36 surrounds the cable 12 itself to assure a waterproof connection at 24.

The towing assembly 14, as shown in FIGURE 2, has a flexible tension sleeve 38 which is concentrically secured around the towing cable 12 by clamp straps 20.

The front end of the sleeve 38 is radially spaced from the cable 12 by an end bushing 40 of rubber which is bonded to the covering of the cable by vulcanizing thereto.

The flexible tension sleeve 38 is formed of a strong stiffly, flexible, protective material which can be bent somewhat during coiling of the whole structure for storage. In effect, the towing assembly 14 provides a flexural transition between the relatively supple cable 12 and the relatively more stiffly flexible eel structure 10. The sleeve 38 is formed, for example, on nylon braided hose material clamped to the end bushing 40 of a strong resilient material, such as rubber, which can withstand the various towing stresses exerted on the equipment during use, and thus the cable 12 is protected by this assembly 14 from undue flexural stress concentrations resulting from forces in the water or from coiling on shipboard.

This towing assembly 14 is attached to the nose member 16 by a screw fitting 42 with the tension sleeve 38 being secured to the screw fitting 42 by clamp straps 20. In this screw fitting there is an axial passage communicating with an axial passage 44 in the nose member through which the towing cable 12 is passed into the interior of the tubular casing 18.

It is to be noted that the towing assembly 14 operates in tension. If desired, in order to provide a back-up or reserve towing assembly in the remote event that the first assembly 14 should weaken or fail, it is possible to include a second towing assembly 54, which is generally similar to the first one except that it is located within the casing, is shorter, and it operates in compression. This second or reserve towing assembly includes a compression sleeve 58 which is secured by clamp straps 20 to a resilient bushing of rubber or the like bonded to the taped cable 12, 36, with the front end of the sleeve 58 being clamped by straps 20 to a second screw fitting 62 which is inserted in the nose member 16 in line with the passage 44, as shown in FIGURE 2. In most cases this second towing assembly 54 is not included, because testing under a wide range of conditions has shown that the first assembly 14 alone is sufficient for situations usually encountered.

The screw fittings 42 and 62, together with the flexible tension sleeve 38 and compression sleeve 58 provide a strong, reliable mechanical connection between the towing cable 12 and nose member 16 for transferring any towing stress from the cable 12 to the nose member 16, thereby isolating the wires A and B and their connections from the towing force exerted on the towing cable.

The first and second attachment screw fittings 42 and 62 are formed from a tough resilient synthetic material, such as nylon, which can withstand long use and avoid fatigue failure at the juncture between the towing cable 12 and the nose 16 of the flexible tubular casing. The nose member itself is made of a rigid thermoplastic material, for example, a rigid polyethylene which can withstand the various towing stresses transferred from the towing cable without failure.

As seen in FIGURES 3 and 4, the hydrophone transducer units 22 are individually responsive to acoustical signals carried by the internal liquid L and impinging upon diaphragms D located at each end of each unit. These units operate upon the variable reluctance principle; that is, the acoustical signals being received cause movement of a magnetically permeable armature which varies the amount of magnetic flux linking with a winding, thereby to produce electrical signals corresponding with the acoustical signals.

The diaphragms D are formed by a rubber shell 65 including a membrane 66 having a magnetically permeable disc armature 68 secured thereto by a layer of non-hardening tacky adhesive 70 so that the disc 68 accurately follows the slightest movements of the rubber shell membrane. A central rubber nib 72 projects through a concentric hole in the disc 68, and a nonmagnetic pin 74 passes through this nib 72 to retain the disc in position. To couple this armature 68 tightly to the membrane 66 the nib 72 is pre-stretched inwardly before the pin 74 is inserted so that the nib 72 remains in tension. Thus, the disc armature 68 accurately follows the movement of the membrane 66 without lost motion. Behind each disc is a spring assembly 76 formed by narrow strips of resilient sponge material, such as sponge rubber, which cross each other at the center with an annular strip near the perimeter of the armature disc 68.

A permanent magnet 78 is located within the unit 22 surrounded by a winding 80 of fine magnet wire which is insulated from the magnet and is potted in resinous potting compound. This winding contains several thousand turns, and it is surrounded by a cylindrical element 82 of magnetically permeable material forming a return path for magnetic flux which passes from one end of the magnet across a gap into the disc armature and radially therein and then across a gap into the cylindrical element 82. The flux path continues out of the other end of the element 82 across a gap into the disc armature and then across a gap back into the magnet. Thus, this flux links the coil 80, and movements of the disc armatures 68 produce corresponding electrical signals in the winding 80.

The cylindrical element 82 also serves as a mechanically rigid protective frame for the interior of the unit 22. A rigid cylindrical skirt 84 of nonmagnetic metal extends from each end of the frame element 82 so as to support the periphery of the membrane 66.

Connections to the winding 80 are made by bringing the opposite ends of this winding out through a radial passageay 86 in the frame element 82 and soldering them to the respective insulated wires A and B. A connection to the conductor of wire A is shown at 88, in FIGURE 3, and there is a similar connection at 89 of the other end of the winding to the wire B.

The wires A and B are shown connected to the windings 80 of each of the transducer units 22 in parallel electrical relationship for transmitting all the electrical signals produced by any of the transducer units 22 to the recording equipment on the survey craft by means of the electrical wires within the towing cable 12 connected to the craft. This parallel electrical connection of multiple hydrophone units positioned axially in the eel 10 I have found to be extremely effective in cancelling out spurious signals resulting from waves 90 on the body of water 26. It is also possible to connect all of these units 22 in series and this is also extremely effective in cancelling spurious signals. The particular connection which is used in most cases is that which produces the best electrical impedance matching relationship to the amplifier equipment at the other end of the cable 12.

The winding 80 is embedded in a settable electrical potting material of good dielectric characteristics.

When the units 22 are being connected at 88 and 89, the rubber shell 65 is not yet present. This shell comprises two identical molded resilient cups having lips which project toward each other to define an annular channel or clearance space 91 (FIGURE 3) surrounding the cylindrical body 82 and communicating with the radial passageway 86 so as to accommodate these connections and the leads from the winding 80. There are four passages 92 extending axially through the lips of each cup, these passages 92 communicating with the annular channel 91. The wires A and B are previously inserted through a pair of opposite passages 92 in these cups. After the connections 88 and 89 have been made, then the cups are positioned around the units 22 in lip to lip engagement. The pair of unoccupied passages 92 are used to inject a suitable potting compound 94 compatible with the shell 65, for example polyurethane potting compound, which thereupon fills the channel 91 so as to surround the connections 88 and 89 and their leads and also to seal the passages 92 around the wires A and B. When this compound 94 has solidified, it joins the two cups together forming a watertight shell 65 surrounding the unit 22. A pair of removable mandrels are placed in the two unoccupied passages 92 after the compound 94 has been injected and before it solidifies so that these two passages 92 remain unobstructed to allow for free passage of liquid L therethrough. Also these passages 92 allow for escape of air when the eel 10 is being filled with liquid.

The transducer units 22 are secured within the flexible tubular case 18 at points spaced along the length thereof by tightly fitting in this casing. Each of the transducer units 22 is cylindrical and is placed in the tubular casing with its axis extending longitudinally thereof. The casing 18 has sufficient resilience that it tightly grips the resilient shell 65 of each unit so as to hold the units 22 securely in place. This hydrophone eel is effective and highly sensitive to any acoustic signal impinging thereon with liquid L filling the interior between the units and throughout the eel, as shown in FIGURE 1.

It is to be noted that each transducer unit 22 is balanced in its electrical output with respect to axial acceleration, because any forces resulting from axial acceleration tend to cause the two armature discs 68 to move in the same direction during such acceleration, i.e. one toward and the other away from the magnet 78. Thus the reduction in reluctance at one end cancels out the increase in reluctance at the other, and vice versa, so that each unit 22 individually, and hence the eel as a whole, is non-responsive to axial acceleration.

There are pressure equalization passages 92 (FIGURE 4) provided by the openings 92 which extend between opposite sides of each transducer unit 22 to allow the passage of water or other liquid throughout the hydrophone eel for equalizing the interior pressure throughout the casing and to allow escape of air for filling, and vice versa when the liquid is removed, for storage or shipment.

The flexible tubular casing 18 is shown as formed of a tough, highly plasticized polyvinyl chloride having a wall thickness of approximately ⅛ of an inch which can withstand the many towing stresses and forces in the water without failing and can adequately protect the internal structure of the hydrophone eel.

The tail plug 28 which is not absolutely necessary to the function or structure of the hydrophone eel is secured to the end of the tubular casing 18 by clamp straps 20. As shown in FIGURE 1, the ends of wires A and B, may be mechanically attached to the tail plug 28 to hold them secure, with sufficient slack to allow the tail plug to be removed when desired to fill the eel 10 with liquid or to empty it. Either fresh or salt water or other liquid may be used as mentioned above, but in cold climates when water is used, it is preferable to include ethylene glycol anti-freeze or similar anti-freeze which is non-injurious to the interior. A suitable tail 29 is ½ inch diameter rope six to eight feet long.

The overall diameter of the hydrophone eel is only 2¾ inches, and tests have shown that this relatively small diameter structure having a rounded nose 16 is capable of being towed through the water with very little turbulence so that it has the ability to pick up very faint acoustical signals. In effect it slides through the water like an eel.

From the foregoing it will be understood that the hydrophone eel structure described above is well suited to provide the advantages and new and improved features set forth and since various embodiments may be made of the features of this invention and as the structure herein described may be varied in various parts, all without departing from the scope of the invention, it is to be understood that all matter hereinbefore set forth are shown in the accompanying drawings is to be interpreted as illustrative and not in a limiting sense and that in certain instances, some of the features of the invention may be used without a corresponding use of other features, all without departing from the scope of the invention as defined by the following claims:

What is claimed is:

1. A hydrophone eel structure adapted to be towed from a craft to receive acoustic signals in a body of water during the making of a seismic survey of geologic formations and strata beneath the body of water, said hydrophone eel structure comprising a flexible tubular casing, a nose plug at the front end of said casing and a tail plug at the trailing end of said casing, towing means connected to said tubular casing for towing the casing through the water, a plurality of hydrophone transducer units secured within said tubular casing at points spaced along the length of said tubular casing, each of said transducer units being cylindrical about an axis and being oriented in said casing with its axis extending longitudinally of the casing, said tubular casing being adapted to have interior liquid therein and being adapted to allow passage of acoustic signals from the surrounding water into the interior liquid, said transducer units being responsive at both of their respective ends to acoustic signals within the interior liquid impinging on both of their ends, and electrical wires within said tubular casing interconnecting said transducer units, said tubular casing having passages therein extending past each transducer unit therein to allow the passage of liquid throughout the entire length of said tubular casing between said nose plug and said tail plug for equalizing the interior pressure throughout the entire length of said casing between said nose plug and said tail plug, and one of said plugs being removable to enable the filling of the entire length of said tubular casing with liquid introduced from one end thereof.

2. A hydrophone eel structure according to claim 1 in which said hydrophone transducer units having signal windings therein connected at each end to said wires within said tubular casing and said hydrophone transducer units being located at points spaced along the length of said tubular casing with the responsive ends of the respective units facing toward but spaced from the responsive ends of the succeeding units, the regions between the responsive ends of succeeding units being filled with liquid extending unobstructed from the responsive end of one unit to the responsive end of the next unit for sensitive and accurate propagation of faint sound signals from the body of water through the tubular casing into the interior liquid and thence through the interior liquid to the responsive ends of the respective units.

3. A hydrophone eel structure as claimed in claim 1 in which said transducer units each include displaceable diaphragms at their opposite ends movable in opposite directions in response to acoustic signals within the interior liquid, whereby each transducer unit is non-responsive to axial acceleration, and the hydrophone eel structure as a whole is non-responsive to axial acceleration.

4. A hydrophone eel structure as claimed in claim 1 in which said tubular casing has a nose member with said towing means being connected to said nose member, said towing means including a towing cable having a plurality of electric wires therein extending to the survey craft for conducting electrical signals thereto, said electrical wires within said casing being connected to said cable wires, said towing means also including a towing assembly secured to said nose member and secured to said cable at a point spaced from said nose member for transferring the towing stress from said cable to said nose member thereby to isolate said electrical wires within said casing from the towing stress, said towing assembly having an effective flexibility between that of the relatively more supple towing cable and that of the relatively more stiff eel structure, said towing assembly providing a flexural transition between said cable and said eel structure.

5. A hydrophone eel adapted to be towed from a craft to receive acoustic signals in a body of water during the making of a seismic survey of geologic formations beneath the body of water, said hydrophone eel comprising a flexible tubular casing, a nose member closing the front of said casing and being attached to said casing, a plurality of hydrophone transducer units mounted within said casing at points spaced along the length of said casing, electrical conductor means connected to each of said transducer units, said conductor means extending within said casing to a region near said nose member, a towing cable containing an electric wire, said towing cable extending toward said nose member, a flexible tension sleeve concentric about said towing cable and being spaced radially from said towing cable, a bushing secured to said cable at a point spaced from said nose member, said tension sleeve being secured to said bushing and to said nose member for towing said eel, and said nose member having a passage extending into said casing with said electric wire and said conductor means being connected through said passage.

6. A hydrophone eel as claimed in claim 5 in which said towing cable extends into said casing through said passage in said nose member, and second mechanical connection means between said cable and said nose member within said casing for transferring any towing stress from said cable to said nose member, thereby to isolate said conductor means from the towing force exerted on said cable.

7. A hydrophone eel as claimed in claim 5 in which said passage in said nose member has a screw fitting secured therein, said screw fitting having an axial passage communicating with said passage in said nose member, with said screw fitting being concentric about said cable, and said tension sleeve being secured to said screw fitting.

8. A hydrophone eel structure as claimed in claim 1 wherein each of said transducer units includes a flexible watertight shell impermeable to the interior liquid, said shell being tightly, resiliently embraced by said casing for securing the units in place within said casing while accommodating a casing of relatively small diameter for minimizing turbulence, said shell of each transducer unit having a plurality of passages extending between opposite ends of said transducer units for allowing the passage of liquid therethrough and allowing the escape of air from within said tubular casing as the liquid is being placed therein.

9. A hydrophone eel structure adapted to be towed from a craft to receive acoustic signals in a body of water during the making of a seismic survey of geologic formations and strata beneath the body of water, said hydrophone eel structure comprising a flexible tubular casing, towing means connected to said tubular casing for towing the casing through the water, a plurality of hydrophone transducer units secured within said tubular casing at points spaced along the length of said tubular casing, each of said transducer units being cylindrical about an axis and being oriented in said casing with its axis extending longitudinally of the casing, said tubular casing being adapted to receive interior liquid therein and being adapted to allow passage of acoustic signals from the surrounding water into the interior liquid, said transducer units being responsive at both end to acoustic signals within the interior liquid impinging on their ends, said transducer units each being surrounded by a watertight shell impermeable to the interior liquid, a plurality of insulated wires extending loosely between said units and being secured thereto in watertight relationship, said transducer units having a plurality of passages therethrough between their opposite ends for allowing the passage of liquid and air therethrough when the liquid is being received in said casing or being discharged therefrom, and said structure including a removable plug adapted to be removed for receiving liquid within said casing or for discharging liquid from said casing when desired.

10. A hydrophone eel structure as claimed in claim 9 wherein said transducer units includes diaphragms at their opposite ends movable in response to acoustic signals impinging thereon, said diaphragms each comprising a flexible membrane included in said watertight shell and a magnetically permeable displaceable armature retained tightly against the membrane to follow the slightest movement thereof without lost motion, and permanent magnet and winding means within the transducer unit for inducing electrical signals in said winding means in response to movements of said armatures, an acoustic signal producing an increase in pressure causing both of said armatures to move towards each other and vice versa, whereby said transducer units are sensitive to acoustic signals impinging upon said diaphragms and are non-responsive to axial acceleration of said hydrophone eel structure.

11. A hydrophone eel structure adapted to be towed from a craft to receive acoustic signals in a body of water during the making of a seismic survey of geologic formations and strata beneath the body of water, said hydrophone eel structure comprising a flexible tubular casing, a plurality of hydrophone transducer units for converting acoustic signals into electrical signals each having a watertight shell surrounding the unit, waterproof insulated electrical wires extending within said tubular casing directly interconnecting said units, said wires being embedded in and sealed to the tubular casing of each hydrophone unit at the points of connection to the respective units, said tubular casing tightly embracing the watertight shells of said transducer units and being adapted to receive water therein, and said watertight shells providing passages through said transducer units for accommodating the passage of the water therethrough when the tubular casing is being filled with water and for equalizing the pressure in the water throughout the length of said tubular casing.

12. A hydrophone eel structure as claimed in claim 11 and wherein said transducer units are axially oriented within said casing and have displaceable diaphragms at their opposite ends adapted to move in response to acoustic signals carried by the interior water within said casing, and said flexible casing allows propagation of acoustical signals from the surrounding body of water into said interior water.

13. A hydrophone eel structure adapted to be towed from a craft to receive acoustic signals in a body of water during the making of seismic survey and readily coiled for storage on shipboard when not in use, said hydrophone eel structure comprising an elongated flexible casing, a plurality of hydrophone transducer units within said casing and located at positions spaced along the length of said casing, said elongated casing having a nose member, a towing cable adapted to extend to the survey craft and having a plurality of electric wires therein for carrying electrical signals from the transducer units to the survey craft, a bushing secured to the towing cable at a position spaced ahead of said nose member, and a strong flexible sleeve secured to said bushing and extending and being secured to said nose member for transferring the towing stress from the cable to said nose member, said sleeve having a larger diameter than said cable and a smaller diameter than said casing providing a flexural transition between the relatively more flexible towing cable and the stiffer casing, whereby the cable is protected from undue flexural stress concentrations near the nose member when being towed in the water and when coiled on shipboard for storage.

14. A watertight sensitive hydrophone unit for immersion in water to receive acoustic signals during the making of a seismic survey, said hydrophone unit including permanent magnet means having a pair of ends, an electrical winding having thousands of turns surrounding said magnet means, a cylindrical element of magnetically permeable material surrounding said winding and providing a return path for magnetic flux from said magnet means, said cylindrical element having a radial passageway therein, said winding having its ends extending out through a radial passageway in said cylindrical element, a watertight shell surrounding said cylindrical element and having a pair of resilient membranes extending across opposite ends of said cylindrical element in spaced relationship from the respective ends of said magnet means, electrical wires connected to the ends of said winding and being bonded into said watertight shell, a pair of armature discs of mangetically permeable material and each being positioned adjacent to a respective diaphragm on the inside thereof and spaced from the adjacent end of said magnet means, each of said armature discs having a hole therein, each of said membranes having a resilient nib extending inwardly through the hole in the adjacent disc, said nib being pre-stretched in tension, and a pin inserted through the pre-stretched nib adjacent to the inside surface of said disc holding the disc against the membrane for following the movement of the membrane without lost motion, thereby to provide a sensitive response for receiving faint acoustic signals.

15. A watertight sensitive hydrophone unit as claimed in claim 14 and wherein a layer of non-hardening tacky adhesive is positioned between said disc and said membrane.

16. A watertight sensitive hydrophone unit as claimed in claim 14 and wherein said watertight shell comprises a pair of resilient cups fitting over the opposite ends of said cylindrical element and having their lips projecting toward each other, with a solidifying potting compound sealing between said lips and having the ends of the winding embedded therein.

References Cited

UNITED STATES PATENTS

| | | | |
|---|---|---|---|
| Re. 23,552 | 9/1952 | Babb et al. | 181—.5 |
| 2,465,696 | 3/1949 | Paslay | 181—.5 |
| 2,735,303 | 2/1956 | Haase | 340—7 X |
| 3,018,467 | 1/1962 | Harris | 340—14 |

BENJAMIN A. BORCHELT, *Primary Examiner.*

P. A. SHANLEY, R. M. SKOLNIK, *Assistant Examiners.*